United States Patent
Baur et al.

(10) Patent No.: US 8,005,261 B2
(45) Date of Patent: Aug. 23, 2011

(54) MODEL-BASED OBJECT CLASSIFICATION AND TARGET RECOGNITION

(75) Inventors: Henrik Baur, Senden (DE); Helmuth Eggers, Ulm (DE); Lars Krüger, Ulm (DE); Rainer Ott, Ulm (DE)

(73) Assignee: EADS Deutschland GmbH, Munich (DE)

( * ) Notice: Subject to any disclaimer, the term of this patent is extended or adjusted under 35 U.S.C. 154(b) by 1000 days.

(21) Appl. No.: 10/488,927

(22) PCT Filed: Sep. 16, 2002

(86) PCT No.: PCT/DE02/03423
§ 371 (c)(1),
(2), (4) Date: Aug. 18, 2004

(87) PCT Pub. No.: WO03/025843
PCT Pub. Date: Mar. 27, 2003

(65) Prior Publication Data
US 2004/0267682 A1    Dec. 30, 2004

(30) Foreign Application Priority Data
Sep. 15, 2001 (DE) ................ 101 45 608

(51) Int. Cl.
*G06K 9/00* (2006.01)
(52) U.S. Cl. ........ 382/103; 382/190; 382/192; 382/224; 382/225; 382/227
(58) Field of Classification Search .......... None
See application file for complete search history.

(56) References Cited

U.S. PATENT DOCUMENTS
4,470,048 A * 9/1984 Short, III ............ 342/189
(Continued)

FOREIGN PATENT DOCUMENTS
DE    19652925    7/1998
(Continued)

OTHER PUBLICATIONS

Morimoto, C.H.; Flickner, M., "Real-time multiple face detection using active illumination," Automatic Face and Gesture Recognition, 2000. Proceedings. Fourth IEEE International Conference on, vol., No., pp. 8-13, 2000.*

(Continued)

*Primary Examiner* — Jason M Repko
*Assistant Examiner* — Gandhi Thirugnanam
(74) *Attorney, Agent, or Firm* — Greenblum & Bernstein, P.L.C.

(57) ABSTRACT

Method for at least one of model-based classification and target recognition of an object. The method includes recording an image of an inanimate object, determining a feature that represents a part of the inanimate object, determining at least one condition associated with the feature that indicates an applicability of the feature based on at least one of geometry of the object, distance of the object from a camera, illumination conditions, contrast, speed of the object, height of the object, and relative position of the object to a camera, and carrying out the at least one of classification and target recognition of the object by recording the feature when the at least one condition indicates the applicability of the feature. At least one of object classification and target recognition is carried out for a feature of the object that is visible and recordable according to the position of the object. The recording, the determining the feature, the determining the at least one condition, and the carrying out are implemented on a computer.

32 Claims, 9 Drawing Sheets

U.S. PATENT DOCUMENTS

| | | | | |
|---|---|---|---|---|
| 5,332,176 | A * | 7/1994 | Wootton et al. | 244/3.11 |
| 5,424,823 | A * | 6/1995 | Nettles et al. | 356/5.01 |
| 5,444,791 | A * | 8/1995 | Kamada et al. | 382/190 |
| 5,579,409 | A * | 11/1996 | Vaidyanathan et al. | 382/203 |
| 5,604,820 | A * | 2/1997 | Ono | 382/190 |
| 5,625,702 | A * | 4/1997 | Kamada et al. | 382/107 |
| 5,640,468 | A * | 6/1997 | Hsu | 382/190 |
| 5,644,386 | A * | 7/1997 | Jenkins et al. | 356/4.01 |
| 5,740,274 | A * | 4/1998 | Ono et al. | 382/190 |
| 5,825,921 | A * | 10/1998 | Dulong | 382/181 |
| 5,872,858 | A * | 2/1999 | Kamada et al. | 382/107 |
| 5,893,085 | A * | 4/1999 | Phillips et al. | 706/52 |
| 5,963,653 | A * | 10/1999 | McNary et al. | 382/103 |
| 6,151,424 | A * | 11/2000 | Hsu | 382/294 |
| 6,404,920 | B1 * | 6/2002 | Hsu | 382/190 |
| 6,512,849 | B1 * | 1/2003 | Yair et al. | 382/202 |
| 6,614,917 | B1 * | 9/2003 | Phillips | 382/103 |
| 6,647,139 | B1 * | 11/2003 | Kunii et al. | 382/159 |
| 6,801,661 | B1 * | 10/2004 | Sotak et al. | 382/203 |
| 6,819,782 | B1 * | 11/2004 | Imagawa et al. | 382/115 |
| 6,850,627 | B2 * | 2/2005 | Phillips | 382/103 |
| 6,937,746 | B2 * | 8/2005 | Schwartz | 382/103 |
| 7,149,326 | B2 * | 12/2006 | Bornowski | 382/103 |
| 2002/0001398 | A1 * | 1/2002 | Shimano et al. | 382/104 |
| 2003/0044072 | A1 * | 3/2003 | Kaneko et al. | 382/190 |
| 2003/0138146 | A1 * | 7/2003 | Johnson et al. | 382/190 |
| 2005/0157931 | A1 * | 7/2005 | Delashmit et al. | 382/190 |
| 2006/0210170 | A1 * | 9/2006 | Yumoto et al. | 382/219 |
| 2006/0285755 | A1 * | 12/2006 | Hager et al. | 382/224 |

FOREIGN PATENT DOCUMENTS

| | | |
|---|---|---|
| DE | 19831413 | 4/2000 |
| DE | 10045360 | 3/2002 |
| EP | 0622750 | 11/1994 |

OTHER PUBLICATIONS

English Language Abstract of DE 100 45 360.
English Language Abstract of DE 198 31 413.
English Language Abstract of DE 196 52 925.
F. Dellaert et al., "Model-Based Car Tracking Integrated with a Road-Follower," Proceedings of the 1998 IEEE International Conference on Robotics & Automation, pp. 1889-1894.
K. Ikeuchi et al., "Applying Sensor Models to Automatic Generation of Object Recognition Programs," Proceedings of the $2^{nd}$ International Conference on Computer Vision, pp. 228-237, Dec. 1988.
R.C. Luo et al., "A Tutorial on Multisensor Integration and Fusion," Proceedings of the Annual Conference of the Industrial Electronics Society, pp. 707-722, Nov. 1990.
J. Peterson et al., "Lambda in Motion: Controlling Robots with Haskell," Proceedings of the International Conference on Practical Aspects of Declarative Languages, pp. 91-105, 1998.
J. Leonard et al., "Dynamic Map Building for an Autonomous Mobile Robot," IEEE International Workshop on Intelligent Robots and Systems, pp. 89-96, 1990.
D.G. Lowe et al., "Fitting Parameterized Three-Dimensional Models to Images," IEEE Transactions on Pattern Analysis and Machine Intelligence, vol. 13, No. 5, 1991.
L. Stephan et al., "Portable, Scalable Architecture for Model-Based FLIR ATR and SAR/FLIR Fusion," Automatic Target Recognition IX, vol. 3718, Aug. 1999.
D. F. Watson, "Computing the n-dimensional Delaunay tessellation with application to Voronoi polytopes," The Computer J., vol. 24, No. 2, pp. 167-172.
R. M. Haralick, "Pose Estimation from Corresponding Point Data," IEEE Transactions on Systems, Man and Cybernetics, vol. 19, No. 6, Nov./Dec. 1989.
Canada Office action, mail date is Dec. 22, 2010.

* cited by examiner

MODEL-BASED OBJECT CLASSIFICATION AND TARGET RECOGNITION

BACKGROUND OF THE INVENTION

1. Field of the Invention

The present invention relates in general to a model-based object classification and target recognition and in particular to a structure and the execution of models for object classification and localization.

2. Discussion of Background Information

All previously known methods from the prior art which use explicit geometry models for matching extract only few features at the same time from the input data. There are several reasons for this.

For one reason, it is difficult to fuse different features so that identical benchmark values have an identical meaning. For another reason, there are purely practical reasons that will be explained in more detail below.

Furthermore, the rules of when a feature of a model is to be checked, are either just as firmly programmed in as the feature itself or they are determined from the geometry of the object.

The previously known systems, thus also those of D. G. Lowe in *Fitting Parametrized Three-Dimensional Models to Images*, IEEE Transact. on Pattern Analysis and Machine Intelligence, Vol. 13. No. 5, 1991, those of L. Stephan et al. in *Portable, scalable architecture for model-based FLIR ATR and SAR/FLIR fusion*, Proc. of SPIE, Vol. 0.3718, Automatic Target Recognition IX, August 1999 and those described in EP-A-622 750 have in general a fixed arrangement of the image processing and in particular a fixed arrangement of the preprocessing.

According to these known systems, the image is read in, then it is preprocessed and subsequently matching is carried out. This means in the known systems that either all preprocessing whose results are contained in any model has to be carried out or firmly implemented tests have to be carried out that avoid this preprocessing.

A method for classifying documents, in particular bank notes, is known from DE 10045360 A1 in which a document to be classified is classified in a certain class on the basis of features with higher significance. In this connection the document is subdivided into individual feature areas which are preferably square. Among these feature areas additionally selected feature areas are formed which are used for determining the class. The establishment of these selected feature areas thereby occurs in a separate adaptation process before classification on the basis of reference documents. In this connection the selected feature areas have a higher significance, i.e. deciding force, than the other feature areas.

SUMMARY OF THE INVENTION

One aspect of the present invention is therefore to make available a method for object classification and target recognition which minimizes the necessary computer resources and yet at the same time is more robust.

Another aspect of the present invention is to make available a method for object classification and target recognition which minimizes the number of preprocessing steps.

These aspects and other aspects to be taken from the specification and figures below are attained by a method for the model-based classification and/or target recognition of an object. The method includes recording an image of an object and determining a feature that represents a part of the object. Moreover the method includes determining at least one condition that is linked to the feature and that indicates the applicability of the feature and carrying out the classification and/or target recognition of the object by recording the feature if the condition indicates the applicability of the feature. The determining a feature that represents a part of the object can further include the determination of a plurality of features, the determining at least one condition can include the determination of at least one condition for each of the features, and the carrying out the classification can include the classification and/or target recognition of the object through the detection of the plurality of features. The method can further include an algorithm for the at least one condition which can be programmed freely as desired. Furthermore, the condition can be selected from one of geometry of the object, distance of the object from a camera, illumination conditions, contrast, speed, of the object, height of the object and relative position of the object to a camera. Moreover the method can include at least one step for the preprocessing for the detection of a specific feature, and before the preprocessing for the specific feature a test is carried out on whether the preprocessing for the specific feature has been carried out in connection with another feature, and, if so, the use of the preprocessing of the other feature for the specific feature. Additionally, the preprocessing carried out can be deposited in a cache memory. Moreover, the feature can be the "left edge" or "right edge" of an object and each of these features can be included in the "edge image" preprocessing. Additionally, all reusable preprocessing steps can be stored in the sequence of compilation. Moreover, the cache may not be restricted in the type of preprocessing.

One aspect of the invention includes a method for at least one of model-based classification and target recognition of an object. The method further includes recording an image of an object and determining a feature that represents a part of the object. Moreover, the method includes determining at least one condition associated with the feature that indicates an applicability of the feature based on at least one of: geometry of the object, distance of the object from a camera, illumination conditions, contrast, speed of the object, height of the object, and relative position of the object to a camera. Additionally, the method includes carrying out the at least one of classification and target recognition of the object by recording the feature when the at least one condition indicates the applicability of the feature where the position and orientation of the object are based upon at least one of an image-recording device, a technical device carrying the image-recording device, objects classified and localized with the present method, objects classified or localized with other methods, and fixed facilities.

In a further aspect of the invention, the method can include determining of the feature that represents a part of the object comprises determining a plurality of features. Moreover, the determining of the at least one condition can include determining at least one condition for each of the plurality of features, and the carrying out the at least one classification and target recognition of the object includes at least one of classifying and target recognizing of the object through the detection of the plurality of features. Furthermore, the determining of the feature that represents a part of the object can include determining a plurality of features. Additionally, the determining of at least one condition can include determining at least one condition for each of the plurality of features. Moreover, the carrying out of the at least one classification and target recognition of the object can include at least one of classifying and target recognizing of the object through the detection of the plurality of features. The method can further include a programmable algorithm is associated with the at least one condition and the method further can include programming the algorithm as desired.

Additionally, the method can include preprocessing for the detection of a specific feature. Moreover, the method can include testing, before the preprocessing for the detection of the specific feature, whether the preprocessing for the detection of the specific feature has been carried out in connection with another feature. Furthermore, the method can include using, when preprocessing for the detection of the specific feature has been carried out for the another feature, the preprocessing of the another feature as the preprocessing for the detection of the specific feature. Additionally, the method can include storing the preprocessing in a cache memory. Moreover, the specific feature can be one of a left edge and right edge of an object and the preprocessing of each of these features comprises edge image preprocessing. Furthermore, the method can include storing all reusable preprocessing as a sequence of compilation. Additionally, the cache may not restricted to a type of preprocessing.

Another aspect of the invention includes a method for at least one of model-based classification and target recognition of an object. The method includes recording an image of an object and determining a feature that represents a part of the object. The method further includes determining at least one condition associated with the feature that indicates an applicability of the feature based on at least one of: geometry of the object, distance of the object from a camera, illumination conditions, contrast, speed of the object, height of the object, and relative position of the object to a camera and carrying out the at least one classification and target recognition of the object by recording the feature when the condition indicates the applicability of the feature. Furthermore, the condition is one of geometry of the object, distance of the object from a camera, illumination conditions, contrast, speed of the object, height of the object, and relative position of the object to the camera.

In a further aspect of the invention, the method can include determining of the feature that represents a part of the object comprises determining a plurality of features. Moreover, the determining of the at least one condition can include determining at least one condition for each of the plurality of features, and the carrying out the at least one classification and target recognition of the object includes at least one of classifying and target recognizing of the object through the detection of the plurality of features. Furthermore, the determining of the feature that represents a part of the object can include determining a plurality of features. Additionally, the determining of at least one condition can include determining at least one condition for each of the plurality of features. Moreover, the carrying out of the at least one classification and target recognition of the object can include at least one of classifying and target recognizing of the object through the detection of the plurality of features. The method can further include a programmable algorithm is associated with the at least one condition and the method further can include programming the algorithm as desired. Additionally, the method can include preprocessing for the detection of a specific feature. Moreover, the method can include testing, before the preprocessing for the detection of the specific feature, whether the preprocessing for the detection of the specific feature has been carried out in connection with another feature. Furthermore, the method can include using, when preprocessing for the detection of the specific feature has been carried out for the another feature, the preprocessing of the another feature as the preprocessing for the detection of the specific feature. Additionally, the method can include storing the preprocessing in a cache memory. Moreover, the specific feature can be one of a left edge and right edge of an object and the preprocessing of each of these features comprises edge image preprocessing. Furthermore, the method can include storing all reusable preprocessing as a sequence of compilation. Additionally, the cache may not restricted to a type of preprocessing.

BRIEF DESCRIPTION OF THE DRAWINGS

Exemplary embodiments of the invention will be explained in more detail on the basis of a drawing. They show.

DETAILED DESCRIPTION OF THE PRESENT INVENTION

The present invention is based on the knowledge that certain features are visible only from special views. Thus, e.g., the windows of the cargo hold doors of helicopters are visible only from the side, but not from other angles of view. This applies analogously to the illumination conditions that permit the recognition of cargo hold doors or of other elements of helicopters (such as, e.g., wheels, lifting load, etc.) only under certain light conditions. Therefore, according to the present invention at least one feature to be recognized is linked to at least one condition or at least one rule. Of course, it is possible to link a plurality of features to respective specific conditions and/or to associate several conditions with a single feature to be recognized. Under these conditions only those features would thus have to be extracted from the image with which the respective linked condition is met. In other words, no object classification and/or target recognition needs to be carried out for a cargo hold door that cannot be visible at all according to the position of the helicopter with reference to a camera.

According to the invention, the possibility was found of depositing various features (e.g., edges, area circumferences, hot spots) in the model in a simple and consistent manner and of carrying out the extraction of these features in an effective manner.

If further features are to be extracted in the known image processing systems according to the prior art cited above, their calls, including parameter transfer, have to be explicitly programmed for each application or each model. This can be more or less expensive, depending on the system. This rigid sequence comprising the creation of an image, the segmentation of the created image and the preprocessing of the image recorded through the segmentation is known from EP-A-622 750.

In accordance with the present invention, each feature that is to be recognized is provided with a condition that establishes the condition's applicability. The algorithm of this condition can be freely programmed as desired and is not restricted only to the geometry of the object. The condition can also examine, e.g., the distance of the object to be recognized from the camera, the illumination conditions (e.g., contrast), speed, height, relative position, etc.

By considering one or more of the conditions, the superfluous work caused by "non-visibility" or "non-recordability" of a feature is avoided and the method according to the invention is at the same time made more robust, since missing features do not lead to a worse assessment of the model.

According to a further particularly preferred aspect of the present invention, each feature that meets a condition and is thus required in a preprocessing of a partial step of the image processing, is requested by this partial step. The sequence of the preprocessing as well as the algorithm of the partial step are thereby deposited in the model (e.g., as the number of a function in a list of available functions). The superfluous work in a rigid arrangement of image creation, preprocessing and classification/localization, is thus avoided.

Since different partial steps may possibly need the same features (e.g., the left edge and right edge features of an object require the "edge image" preprocessing) or partial results of lower preprocessing represent inputs for higher preprocessing (e.g., edge image and wavelet segmentation of the filtered original image, with the aid of which the local characteristics of a function can be studied efficiently by local wavelet bases), all reusable preprocessing steps are stored in the sequence of the compilation, beginning with the original image. If a specific preprocessing is required, a "request" for this preprocessing with all preceding steps of this preprocessing, beginning with the original, is carried out through the image processing.

The treatment of the request lies in carrying out the preprocessing and depositing and making available the result or, if already present, making available the deposited result, without carrying out a new calculation. As already mentioned, existing preprocessing or preprocessing series can thus be quickly called from an intermediate memory (cache). If, e.g., the preprocessing 1 is carried out for a feature A, and if preprocessing 1, 2 and 3 are necessary for a further feature B, the preprocessing 1 of the feature 1 according to the invention in intermediate storage can thus be accessed, which means the processing time is reduced.

With these steps it is possible to extract all the features necessary for the recognition of an object (after a corresponding normalization) and to feed them to the recognition process. One is therefore no longer restricted to a small number of features for reasons of speed or maintenance. Of course, the preprocessing of the system according to the invention also takes time for calculation, but only calculations that are absolutely necessary are carried out, since each preprocessing is to be carried out only once. Different features can thus be extracted as long as the total time of all preprocessing does not exceed the maximum run time.

The method for preprocessing described above can be implemented according to the invention regardless of the fact that certain features are only visible from special views. In other words, the present preprocessing can be carried out independently of the link to one of the certain conditions, although the combination of the two features has a particularly advantageous effect with reference to the computer resources and the robustness of the system.

The method for preprocessing according to the invention is particularly advantageous compared to the prior art. The method presented by D. G. Lowe in *Fitting Parametrized Three-Dimensional Models to Images*, IEEE Transact. on Pattern Analysis and Machine Intelligence, Vol. 13, No. 5, 1991, recognizes the sought objects on the basis of edges. These edges are expressed as parametrized curves and the free parameters (spatial position and internal degrees of freedom) are determined through an approximation method. The method is relevant in that it deposits geometric preprocessing in a cache. However, the cache of the known method of Lowe relates only to visibility conditions, whereas the cache or intermediate memory according to the invention is not limited in the type of preprocessing. Likewise the visibility conditions are determined only from the geometry of the object and are not freely selectable. Otherwise the method of Lowe is a typical representative of methods with firmly implemented preprocessing.

The method according to L. Stephan et al. (*Portable, scalable architecture for model-based FLIR ATR and SAR/FLIR fusion*, Proc. of SPIE, Vol. 3718, Automatic Target Recognition IX, August 1999) extracts features not specified in detail from radar images (SAR) and extracts edges from the infrared images (FLIR images). A separate hypothesis formation is carried out with each of these features and finally these hypotheses are fused. The entire preprocessing is implemented in a fixed sequence in the system; only the geometry models to be found are interchangeable. The precise type and sequence of the preprocessing is given in EP-A-622 750.

A currently particularly preferred exemplary embodiment of the invention will now be explained with reference to the accompanying FIGS. 1 through 5e. This exemplary embodiment can be modified in a manner well known to one skilled in the art, and it is by no means intended to restrict the scope of protection of the invention to the example below. Rather the scope of protection is determined by the features of the claims and their equivalents.

Figure 1:
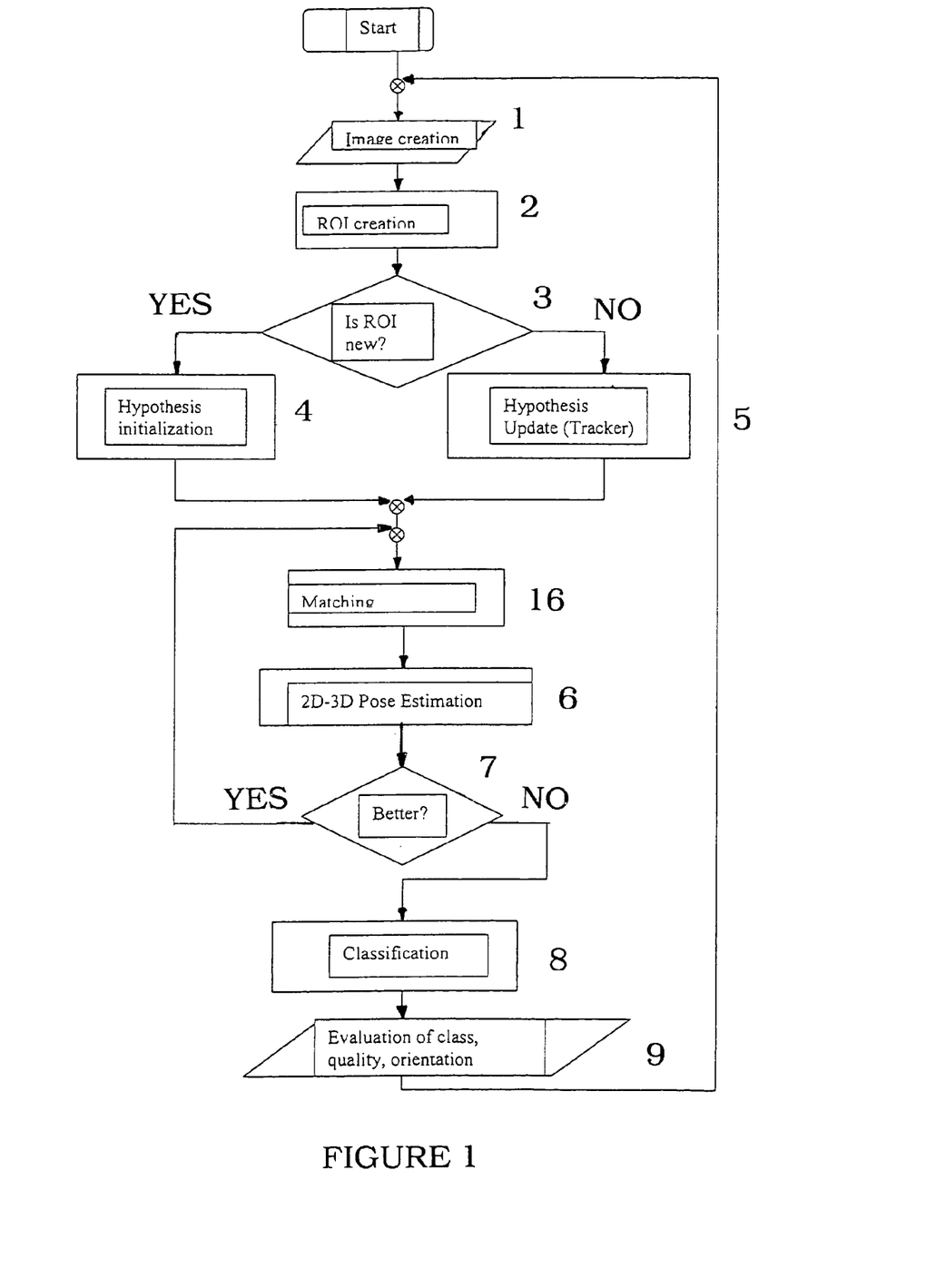
FIG. 1 shows the sequence of operations of object recognition at the highest level.

FIG. 1 shows a sequence of operations of the object recognition at the highest level. In step 1 acquiring the image with a camera, loading a stored image or producing a VR image takes place in the image creation block. An image acquired in the image creation block of FIG. 1 is shown by way of example in FIG. 3.

In step 2 (ROI creation) a simple and quick rough detection of the object in the image takes place, i.e., a rectangular region that most nearly encloses the sought objects is positioned. The abbreviation ROI (region of interest) denotes this region enclosing the sought objects which can be seen with reference to FIG. 4. Methods for determining such an ROI are known per se. These include threshold value methods, pixel classification, etc. An assignment of the currently formed ROI to an ROI from the last image must also be made.

In step 3 a decision is made on whether the object in the region of interest was provided with an ROI for the first time or not. This step is necessary, since no hypotheses to be tested yet exist that are assigned to the ROI and so no test of the hypotheses can take place. If the decision in step 3 is "yes," the hypothesis initialization takes place in step 4. Here the assignment of one or more 7-tuples to an ROI is carried out. The 7-tuple comprises the type of object (e.g., model number (in the case of a helicopter 1=Hind, 2=Helix, 3=Bell Ranger, etc.)) and the estimated six degrees of freedom under the assumption of this model class. The initial compilation of the six degrees of freedom can be made, e.g., through systematic testing.

If the decision in step 3 is "no," the hypotheses update is carried out in step 5. In the event of an already existing hypothesis, the new position created by the movement of the object in space has to be matched to the position of the object in the image. To this end a movement prediction known in the prior art is carried out by means of a tracker (e.g., Kalman filter).

The matching described in detail with reference to FIG. 2 takes place in step 16 of FIG. 1.

The 2D-3D pose estimate is implemented in step 6 of FIG. 1. The change of position of the object in space can be estimated from the change of position of the receptors and the assumed position of the receptors in space (from hypothesis) by means of the 2D-3D pose estimate. Methods for this are known in the prior art (cf., e.g., Haralick: *Pose Estimation from Corresponding Point Data*, IEEE Transactions on Systems, Man and Cybernetics, Vol. 19, No. 6, November/December 1989).

The quality of the model is determined in step 7 ("better" block) of FIG. 1. This is necessary since the matching violates the rigidity property of the object. The rigidity is guaranteed through the pose estimation and new projection, since errors of individual receptors are averaged and a single pose (6 degrees of freedom) is generated for all receptors. A further matching in the same image is useful in order to achieve the best possible result here, i.e., the smallest possible error between hypothesis and image. With a deterioration (or very slight improvement), it is thereby assumed that the optimum point has already been reached.

The evaluation of all hypotheses, in particular their quality values, of an ROI takes place in step 8 of FIG. 1 ("classification" block). The classification produces either the decision for a certain class and pose (by selection or combination of pose values of different hypotheses) or the information that the object cannot be assigned to any known class.

The evaluation of class, quality and orientation takes place in step 9 of FIG. 1. The information from the classification can be displayed to the user in different ways (e.g., position and class as overlay in the image) or actions can be directly derived therefrom (e.g., triggering a weapon). This can be determined after each image or at greater, regular intervals or when specific quality thresholds are exceeded or fallen below or the classification.

The details of the adjustment (matching) are explained with reference to FIG. 2.

Figure 2:
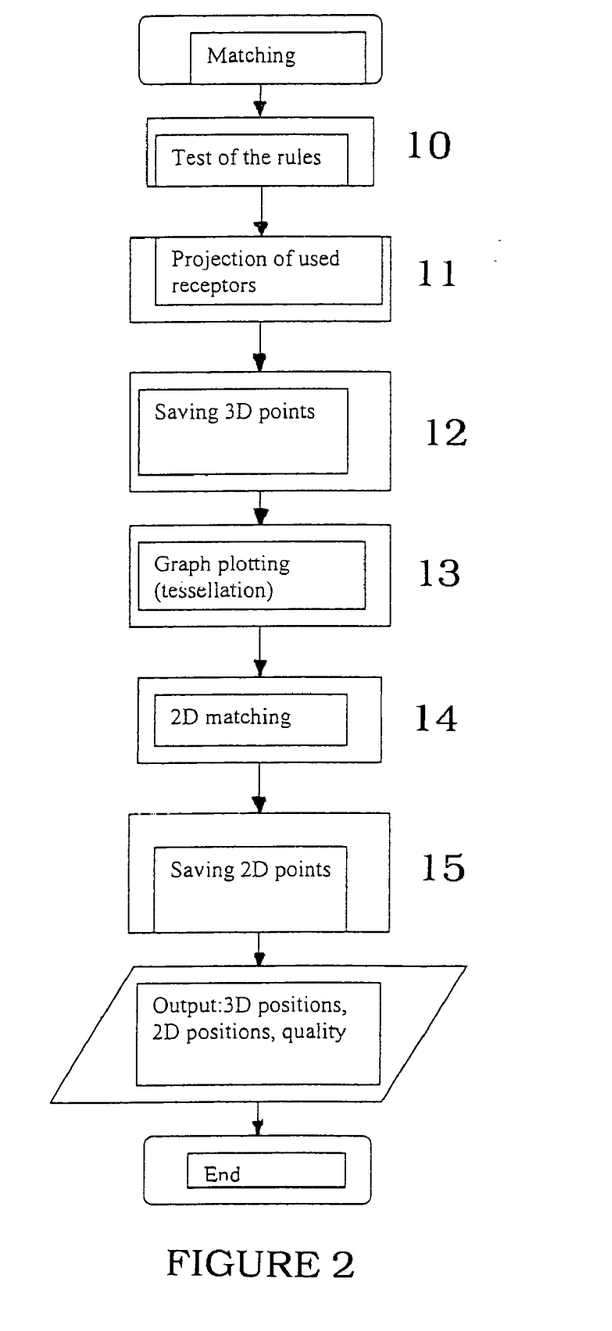
FIG. 2 shows The detailed sequence of operations of the matching block of FIG 1.
Figure 3:
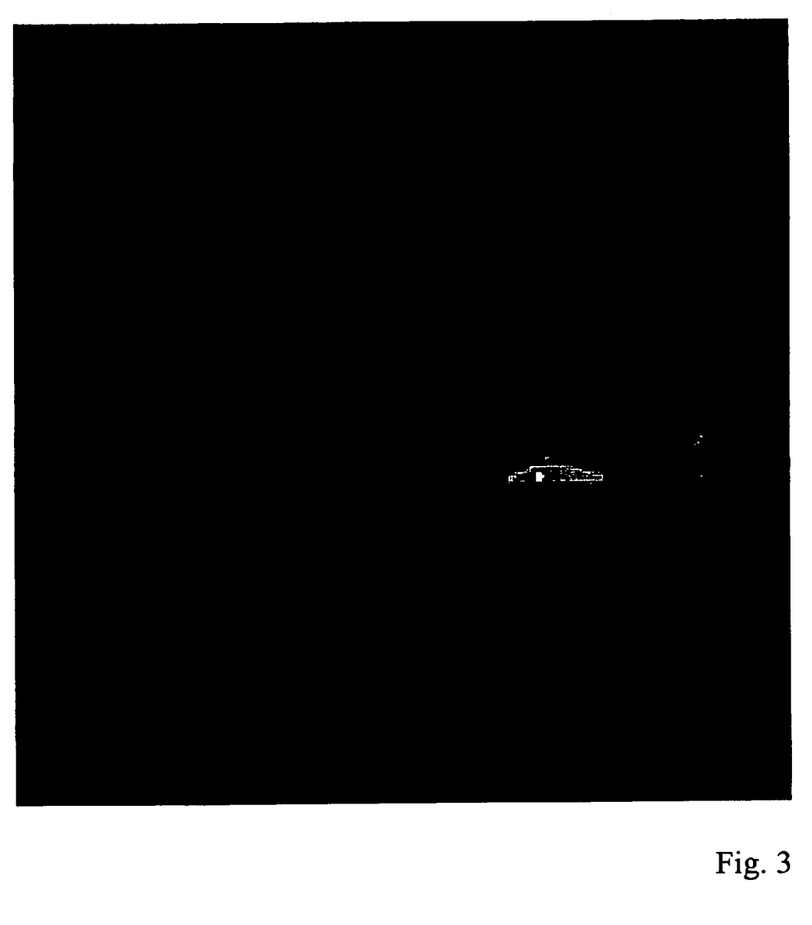
FIG. 3 shows an image acquired in the image creation block of FIG. 1.
Figure 4:
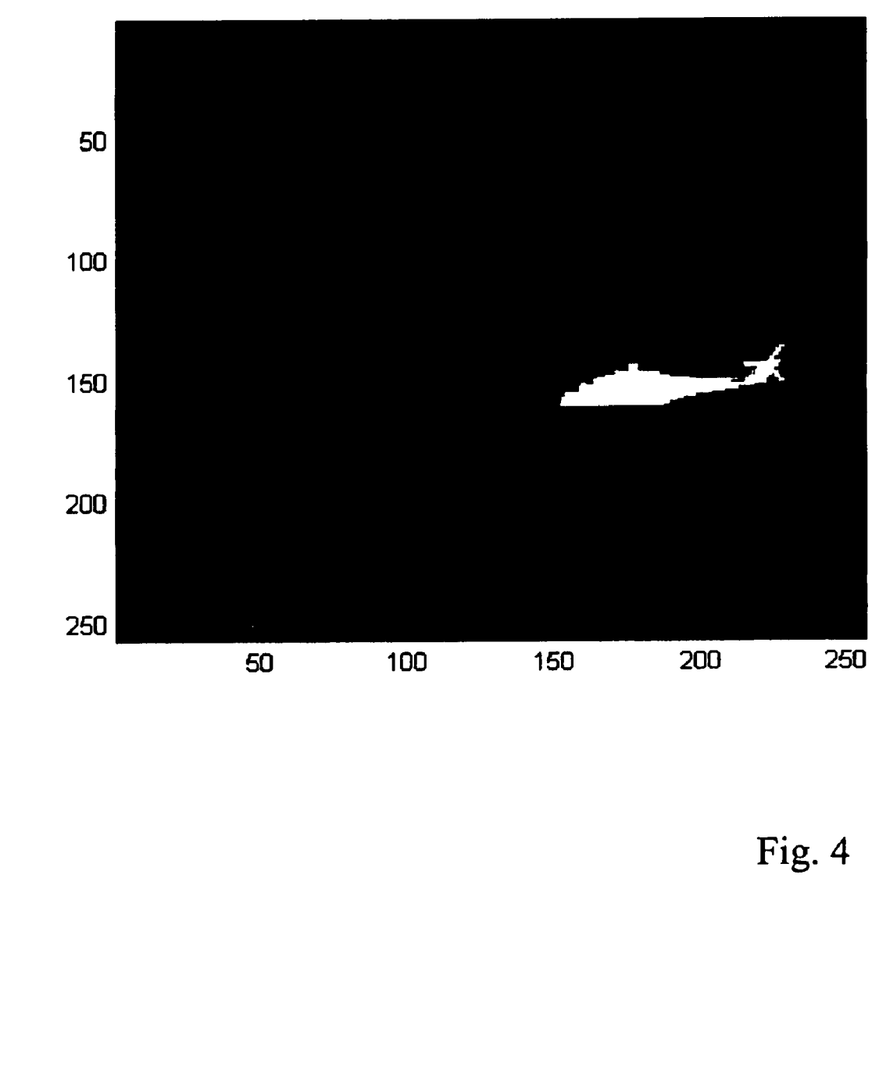
FIG. 4 shows a region (ROI) enclosing the sought objects, which region comprises a rectangular partial section of the image of FIG. 3.

The examination of rules takes place in step 10 of FIG. 2. The rule of each receptor is evaluated and incorporated into the 2D representation (graph) or not on the basis of the result of the receptor. Since various rules can exist for various applications, which rules also process any desired information to produce the rule result, how the method operates is described here using the example of a geometrically motivated rule function. It should be noted that the parameters of the rule function must take into account not only the geometry of the object and its current pose. Other information (e.g., position of the sun, horizon line, friend/foe positions, radio beacons, time of day), as available, can also contribute to the rule result.

The rule function of the vector angle rule contains three parameters that are stored in the model:

a, b and x. Their result is r.

The rule function itself has the following form:

$$\cos\beta = \frac{\langle Rx, -z \rangle}{\|Rx\|\|-z\|}$$

$$r = \begin{cases} 1 & \beta < a \\ 1 - \dfrac{\beta - a}{b} & a \le \beta \le a+b \\ 0 & \beta > a+b \end{cases}$$

The vector z is the unit vector in direction z (view direction of the camera). The matrix R is the rotation matrix from the hypothesis that rotates the model from its original position (parallel to the camera coordinates system) into its current view. The vector x is a vector that describes the center view direction from the object outwards (e.g., the outside normal of a surface).

If r produces a value different from 0, the receptor is incorporated into the 2D representation. The values between 0 and 1 are available for further evaluation but are not currently in use.

The projection of the receptors is carried out in step 11 of FIG. 2.

Step 11 is carried out separately (and possibly in a parallel manner) for each receptor that is included in the graph through the test. The receptor reference point $\underline{p}^3$ is thereby first projected into the image matrix as $\underline{p}^2$.

$$\underline{p}^2 = \underline{P}(R\underline{p}^3 + t)$$

Matrix R is the above-mentioned rotation matrix, t is the vector from the beginning of the camera coordinate system to the beginning of the model coordinate system in the scene (translation vector). Matrix $\underline{P}$ is the projection matrix or camera model:

$$\underline{P} = \begin{bmatrix} fs_x & 0 & 0 \\ 0 & fs_y & 0 \\ 0 & 0 & 1 \end{bmatrix}$$

The value f is thereby the focal length of the camera, $f_{sx}$ and $f_{sy}$ the resolution of the camera in pixels e.g., per millimeter (mm). The value $p^2$ is a homogenous vector (u, v and scaling) in pixels relative to the camera perspective center. This is converted accordingly into the pixel coordinates x and y.

Subsequently the projection function of the receptor is called, which function projects the receptor-specific data. An example of this is an edge receptor, the beginning and end points of which are defined in 3D on the model and are projected into the image matrix through this function in the same way as the reference point.

The storage of the 3D points takes place in step 12. A list of hypotheses points is created in 3D, whereby one or more points per receptor are stored in a defined sequence. The receptor reference point of each receptor can always be found in the list, further points are optional. In addition the edge receptor stores the beginning and end points.

The graph creation is implemented in step 13. A graph is created through tessellation from the mass of the points projected into the image matrix, if it is necessary for the following matching process. The method used is known and described in the following article: Watson, D. F., 1981, *Computing the n-dimensional Delaunay tessellation with application to Voronoi polytopes*: The Computer J., 24(2), p. 167-172.

The 2D matching is carried out in step 14, whereby either the elastic graph matching method according to Prof. v.d. Malsburg is carried out or another method with similar objective. A method of this type was implemented by us that features special properties that are connected to the tracking of the object. Through the method the best possible position of the sought feature has to be found near the start position, whereby a trade-off between feature quality and deviation from the given graph configuration is desirable. In this step it is therefore necessary to carry out some kind of scanning of the image with the application function of the receptor. The match quality of the application function is assigned to each scanned position so that the most favorable position can be determined.

Figure 5A:
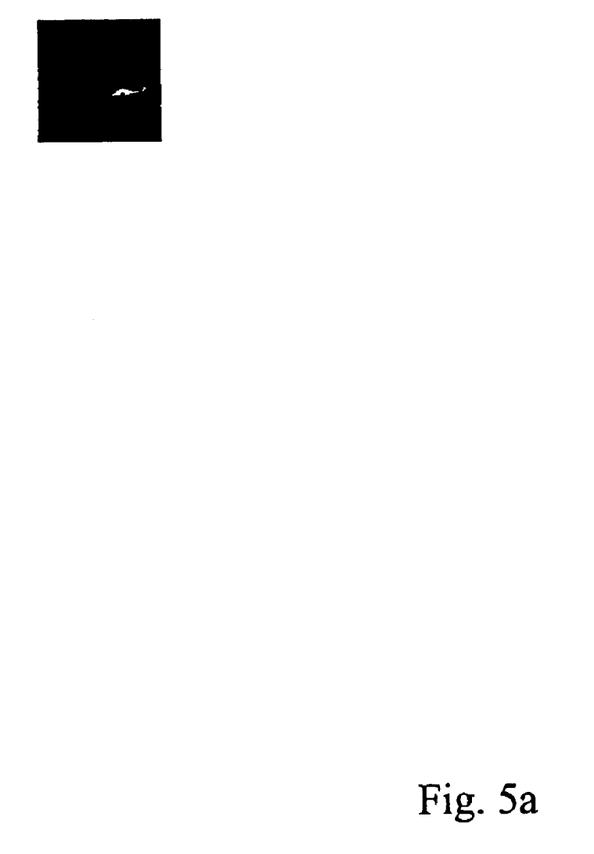
FIGS. 5a, 5b, 5c, 5d, and 5e show how the feature request works on the basis of the example of the edge receptor.
Figure 5B:
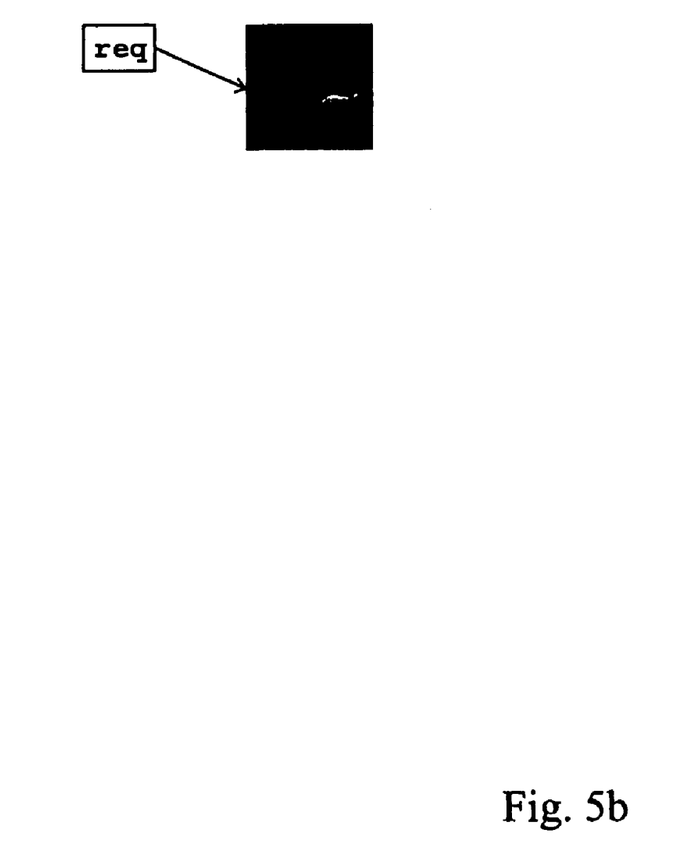
Figure 5C:
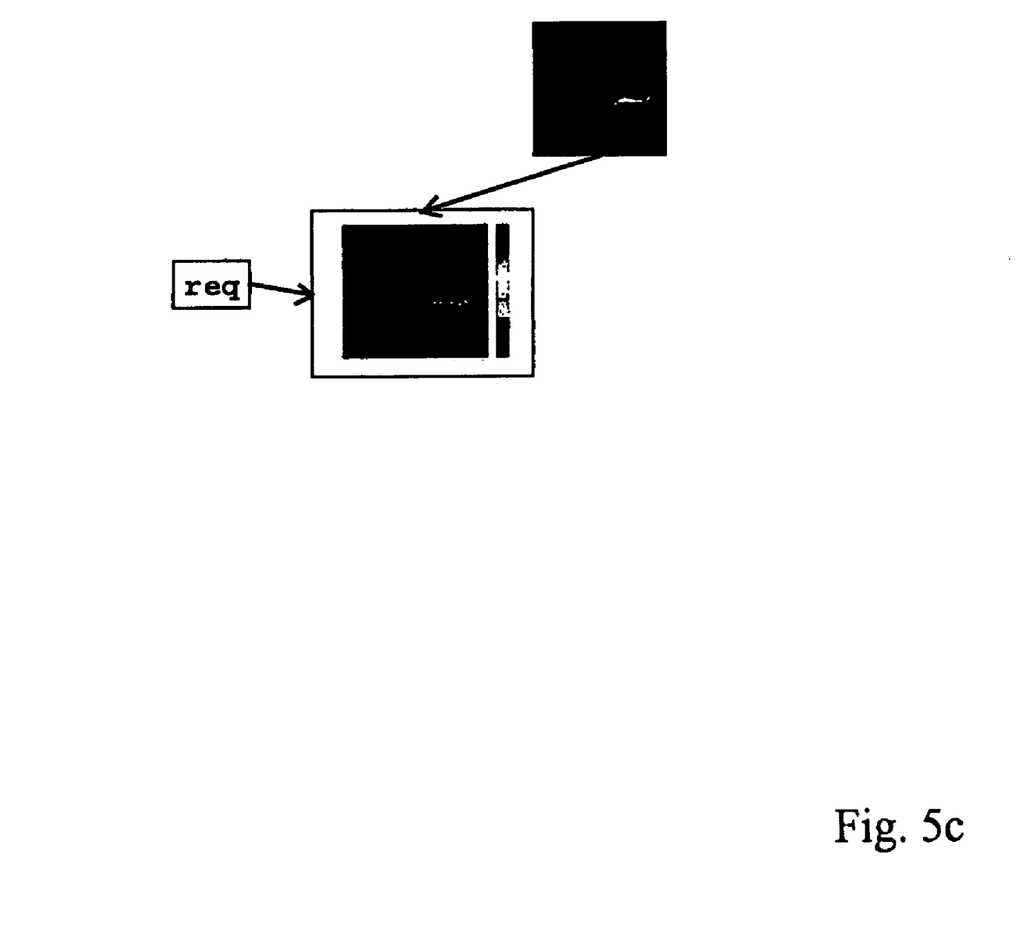
Figure 5D:
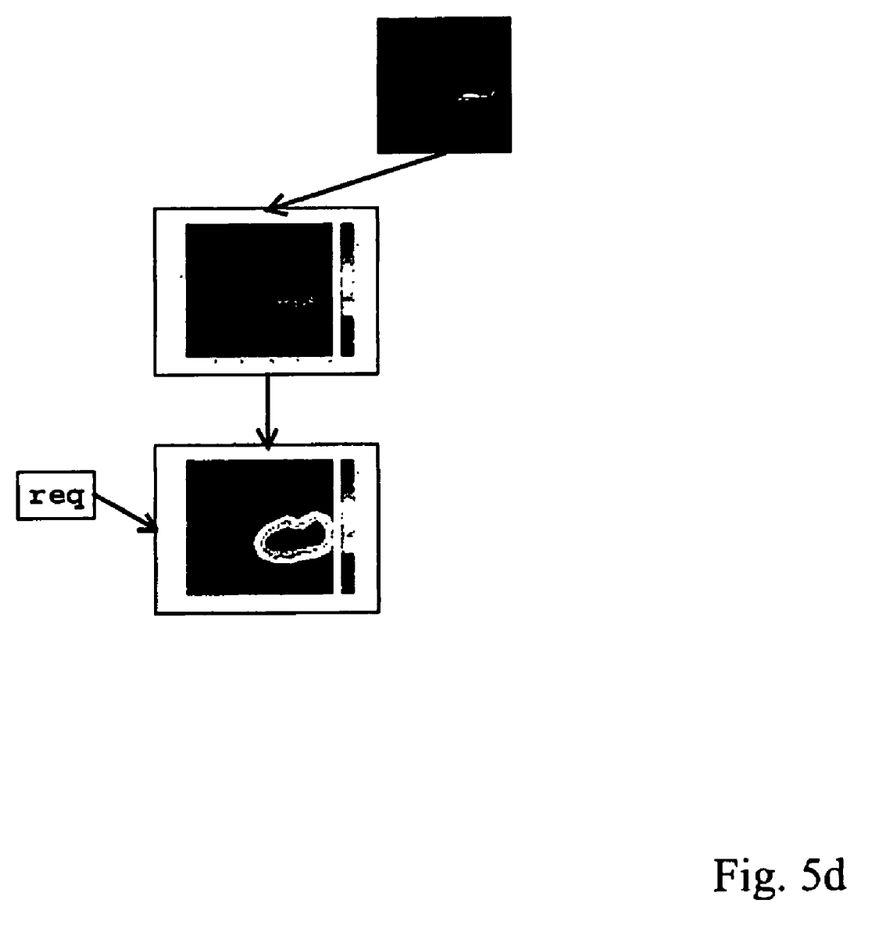
Figure 5E:
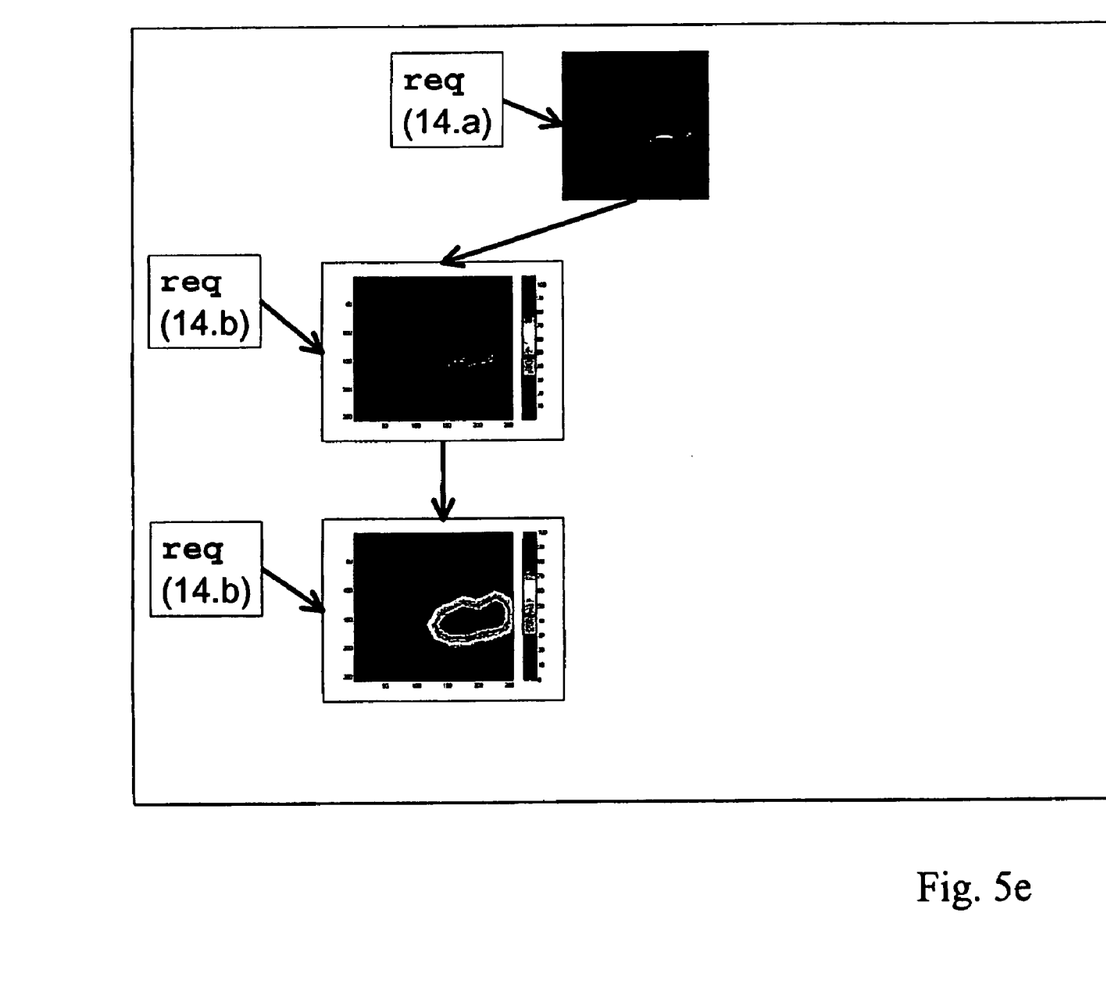

It will now be shown how the feature request works using the example of the edge receptor. To this end, the edge receptor algorithm is given the following pseudocode:

req=root of the preprocessing tree (5.a)

req=request(req.edge_image,threshold=10,sigma=1) (5.b)

req=request(req,distance_image,maximumdistance=100) (5.c)

image=image_fromtree(req) (5.d)

certain_chamfer_distance_along_the_line_ (image, _line) (5.e)

From the image creation (block 1) up to the beginning of 5b, the preprocessing cache is occupied only with the original image.

According to the pseudocode 5a (see FIG. 5.a), the indicator req is placed on the root of the tree.

In the request (5.b) (cf. FIG. 5b) it is established that there are as yet no nodes of the edge image type with the above-mentioned parameters. This is then produced by the registered routine for calculating an edge image.

As shown in FIG. 5c, (5.c) produces the distance image in the same way.

As shown in FIGS. 5d and 5e, (5.d) reads out the image from req and (5.e) calculates the quality of the feature in that at least one of req and (5e) determines the average distance (in pixels) from an image edge. To this end the values are taken directly from the edge image.

In estimating the next position, the tree iterator (req) in (5.1) is re-placed at the root and in (5.b) and (5.c) it is moved on without calculation.

Other receptors that are deposited in the model can expand this tree further, as the free space on the right side of FIG. 5e is intended to indicate.

The storage of the 2D points takes place in step 15 of FIG. 2. The points $\underline{p}^2$ according to the matching step are deposited in a list in the same sequences as in (12). It should thereby be ensured that the synchronicity of both lists is still guaranteed in order to avoid any inconsistencies in matching.

The invention claimed is:

1. A method for at least one of model-based classification and target recognition of an object, the method comprising:
   recording an image of an inanimate object;
   determining a feature that represents a recognized part of the inanimate object;
   determining at least one condition associated with the feature that indicates an applicability of the feature based on at least one of: geometry of the object, distance of the object from a camera, illumination conditions, contrast, speed of the object, height of the object, and relative position of the object to a camera;
   carrying out the at least one of classification and target recognition of the object by recording the feature when the at least one condition indicates the applicability of the feature; and
   matching a position created by a movement of the inanimate object in space to the position of the inanimate object in the image,
   wherein at least one of object classification and target recognition is carried out for a feature of the object that is visible and recordable according to the position of the object,
   wherein the determining the at least one condition occurs before the determining the feature, and
   wherein the recording, the determining the feature, the determining the at least one condition, and the carrying out are implemented on a computer.

2. The method according to claim 1, wherein the determining of the feature that represents a part of the object comprises determining a plurality of features, wherein the determining of the at least one condition comprises determining at least one condition for each of the plurality of features, and wherein the carrying out the at least one classification and target recognition of the object comprises at least one of classifying and target recognizing of the object through the detection of the plurality of features.

3. The method according to claim 1, wherein the determining of the feature that represents a part of the object comprises determining a plurality of features.

4. The method according to claim 3, wherein the determining of at least one condition comprises determining at least one condition for each of the plurality of features.

5. The method according to claim 3, wherein the carrying out the at least one classification and target recognition of the object comprises at least one of classifying and target recognizing of the object through the detection of the plurality of features.

6. The method according to claim 1, wherein a programmable algorithm is associated with the at least one condition and the method further comprises programming the algorithm as desired.

7. The method according to claim 1 further comprising:
   preprocessing for the detection of a specific feature;
   testing, before the preprocessing for the detection of the specific feature, whether the preprocessing for the detection of the specific feature has been carried out in connection with an other feature; and
   using, when preprocessing for the detection of the specific feature has been carried out for the other feature, the preprocessing of the another feature as the preprocessing for the detection of the specific feature.

8. The method according to claim 7 further comprising:
   storing the preprocessing in a cache memory.

9. The method according to claim 7, wherein the specific feature is one of a left edge and right edge of an object and the preprocessing of each of these features comprises edge image preprocessing.

10. The method according to claim 7 further comprising:
    storing all reusable preprocessing as a sequence of compilation.

11. The method according to claim 8, wherein the cache is not restricted to a type of preprocessing.

12. The method according to claim 1, wherein the at least one of object classification and target recognition is carried out for a feature of the object that is visible and recordable according to the position of the object with reference to a camera.

13. The method according to claim 1, wherein the object is an aircraft.

14. The method according to claim 1, wherein the object is a helicopter.

15. The method according to claim 1, further comprising:
    detecting the inanimate object in the image using a region of interest (ROI); and
    matching a movement of the object in space to the position of the object in the image.

16. The method according to claim 15, further comprising estimating a change in position of the object in space.

17. A method for model-based classification and target recognition of an object, the method comprising:

recording an image of an inanimate object;

detecting the inanimate object in the image using a region of interest (ROI);

determining a feature that represents a recognized part of the inanimate object;

determining at least one condition associated with the feature that indicates an applicability of the feature based on at least one of: geometry of the object, distance of the object from a camera, illumination conditions, contrast, speed of the object, height of the object, and relative position of the object to a camera;

carrying out the at least one classification and target recognition of the object by recording the feature when the condition indicates the applicability of the feature;

extracting from the image only the feature which has been linked to the at least one condition such that object classification need not be carried out for a feature of the object that is not visible; and matching a position created by a movement of the inanimate object in space to the position of the inanimate object in the image;

wherein the recording, the determining the feature, the determining the at least one condition, and the carrying out are implemented on a computer.

18. The method according to claim 17, wherein the determining of the feature that represents a part of the object comprises determining a plurality of features, wherein the determining of the at least one condition comprises determining at least one condition for each of the plurality of features, and wherein the carrying out the at least one classification and target recognition of the object comprises at least one of classifying and target recognizing of the object through the detection of the plurality of features.

19. The method according to claim 17, wherein the determining of the feature that represents a part of the object comprises determining a plurality of features.

20. The method according to claim 19, wherein the determining of at least one condition comprises determining at least one condition for each of the plurality of features.

21. The method according to claim 19, wherein the carrying out of the at least one classification and target recognition of the object comprises at least one of classifying and target recognizing of the object through the detection of the plurality of features.

22. The method according to claim 17, wherein a programmable algorithm is associated with the at least one condition and the method further comprises programming the algorithm as desired.

23. The method according to claim 17 further comprising:
preprocessing for the detection of a specific feature;
testing, before the preprocessing for the detection of the specific feature, whether the preprocessing for the detection of the specific feature has been carried out in connection with an other feature; and
using, when preprocessing for the detection of the specific feature has been carried out for the other feature, the preprocessing of the another feature as the preprocessing for the detection of the specific feature.

24. The method according to claim 23 further comprising: storing the preprocessing in a cache memory.

25. The method according to claim 23, wherein the specific feature is one of a left edge and right edge of an object and the preprocessing of each of these features comprises edge image preprocessing.

26. The method according to claim 23 further comprising: storing all reusable preprocessing as a sequence of compilation.

27. The method according to claim 24, wherein the cache is not restricted to a type of preprocessing.

28. The method according to claim 17, wherein the object is an aircraft.

29. The method according to claim 17, wherein the object is a helicopter.

30. The method according to claim 17, further comprising: estimating a change in position of the object in space.

31. A method for model-based classification and target recognition of an object, the method comprising:

recording an image of an inanimate object;

detecting the inanimate object in the image by creating a region of interest (ROI);

determining a feature that represents a recognized part of the inanimate object;

determining at least one condition linked with the feature that indicates an applicability of the feature; and carrying out object classification and target recognition of the object when the at least one condition indicates the applicability of the feature and when the feature of the object is visible and recordable according to the position of the object with reference to a camera;

matching a position created by a movement of the inanimate object in space to the position of the inanimate object in the image, wherein the at least one condition comprises one of geometry of the object, distance of the object from a camera, illumination conditions, contrast, speed of the object, height of the object, and relative position of the object to a camera, and wherein the recording, determining the feature and the at least one condition and the carrying out are implemented on a computer.

32. The method according to claim 31, wherein the object is a helicopter.

* * * * *